(12) United States Patent
Bolard

(10) Patent No.: US 12,570,497 B2
(45) Date of Patent: Mar. 10, 2026

(54) GUIDING CHAIN CARRIER SYSTEM

(71) Applicant: NASEKOMO B.V., Amsterdam (NL)

(72) Inventor: Marc Louis Raymond Bolard, Sofia (BG)

(73) Assignee: NASEKOMO B.V., Amsterdam (NL)

( * ) Notice: Subject to any disclaimer, the term of this patent is extended or adjusted under 35 U.S.C. 154(b) by 291 days.

(21) Appl. No.: 18/043,895

(22) PCT Filed: Sep. 13, 2021

(86) PCT No.: PCT/EP2021/075138

§ 371 (c)(1),
(2) Date: Mar. 2, 2023

(87) PCT Pub. No.: WO2022/053695

PCT Pub. Date: Mar. 17, 2022

(65) Prior Publication Data

US 2023/0312302 A1     Oct. 5, 2023

(30) Foreign Application Priority Data

Sep. 14, 2020     (EP) ..................................... 20195904

(51) Int. Cl.
B65H 75/36          (2006.01)
A01G 18/60          (2018.01)
(Continued)

(52) U.S. Cl.
CPC ........... B65H 75/368 (2013.01); A01G 18/60 (2018.02); B65H 59/384 (2013.01); B65H 63/04 (2013.01); F16G 13/16 (2013.01)

(58) Field of Classification Search
CPC .... B65H 63/04; B65H 59/384; B65H 75/368; A01G 18/50; F16G 13/16
(Continued)

(56) References Cited

U.S. PATENT DOCUMENTS 3,806,400 A * 4/1974 Laethem ........... B32B 17/10981
                                                            156/196
4,023,695 A * 5/1977 Carew ..................... B23Q 7/10
                                                            212/319
(Continued)

FOREIGN PATENT DOCUMENTS

DE          1059066 B      6/1959
DE          3241924 A  * 11/1982
(Continued)

OTHER PUBLICATIONS

International Search Report dated Jan. 4, 2022 for PCT application No. PCT/EP2021/075138.
(Continued)

*Primary Examiner* — Terrell H Matthews

(57)          ABSTRACT

A guiding chain carrier system (1) is configured for an installation (2), for deploying and for storing without folding said guiding chain and flexible supply cables and/or pipelines. Said guiding chain carrier system comprises a mobile workstation (6) movable over a work surface (3) and connected to the said cables and/or pipelines, at least one guiding chain (20), connected to a static connection area (7) on one end and to the mobile workstation (6) on the other end thereof, for supporting said cables and/or pipelines; characterized by at least one compensation trolley (8), comprising a compensation system. Said compensation trolley (8) is movable and the compensation system is able to generate a resistance force in order to maintain the guiding chain (20) straight while the mobile workstation (6) moves from an operation location nearest the static connection area (7) until an operation location furthest from the static connection area (7).

13 Claims, 4 Drawing Sheets

(51) Int. Cl.
  B65H 59/38      (2006.01)
  B65H 63/04      (2006.01)
  F16G 13/16      (2006.01)

(58) Field of Classification Search
  USPC ........................................................ 414/497
  See application file for complete search history.

(56)                    References Cited

U.S. PATENT DOCUMENTS

| | | | | |
|---|---|---|---|---|
| 4,318,533 | A * | 3/1982 | Port ......................... | B66C 13/12 |
| | | | | 254/273 |
| 4,600,817 | A * | 7/1986 | Hackenberg ......... | H02G 11/006 |
| | | | | 248/51 |
| 5,193,660 | A | 3/1993 | Mckernan et al. | |
| 5,692,984 | A | 12/1997 | Kayatani et al. | |
| 9,272,186 | B2 * | 3/2016 | Reich ................. | A63B 23/1209 |
| 2003/0000198 | A1 * | 1/2003 | Hermey ............... | H02G 11/006 |
| | | | | 59/78.1 |
| 2015/0037098 | A1 | 2/2015 | Carter | |

FOREIGN PATENT DOCUMENTS

| | | | | | |
|---|---|---|---|---|---|
| DE | 3241924 | A1 | 5/1984 | | |
| DE | 3806400 | A1 | 9/1989 | | |
| EP | 0007554 | A1 * | 2/1980 | ............. | B65H 75/34 |
| JP | H7-213154 | A | 8/1995 | | |
| JP | H10-220533 | A | 8/1998 | | |
| JP | 2015037098 | A * | 2/2015 | ........... | H01L 21/681 |
| KR | 101849162 | B1 * | 5/2018 | ............. | A01G 18/64 |
| KR | 20180093258 | A | 8/2018 | | |
| SU | 362161 | A1 | 12/1972 | | |
| SU | 576035 | A3 | 10/1977 | | |

OTHER PUBLICATIONS

European Search Report dated Feb. 11, 2021 for European Application No. EP20195904.
The Office Action dated Jan. 14, 2025 for Russian Application No. Application No. 2023107801/07(016915).
Search Report dated Jan. 13, 2025 for Russian Application No. 20195904.6.
Notice of Reasons for Rejection for Japanese Patent Application No. 2023-516832, dated Jul. 1, 2025.

* cited by examiner

GUIDING CHAIN CARRIER SYSTEM

This application is a national stage application, filed under 35 U.S.C. § 371, of International Patent Application No. PCT/EP2021/075138, filed on Sep. 13, 2021, which claims priority to European application no. 20195904.6 filed Sep. 14, 2020, which is incorporated by reference herein in its entirety.

FIELD OF THE INVENTION

The present invention relates to the domain of guiding chain carrier systems, more precisely to a system to deploy and to store a guiding chain guiding flexible cables and/or pipelines connected to a single static connection point on one hand and to a mobile workstation on another hand.

TECHNOLOGICAL BACKGROUND

More precisely, the mobile workstation needs to operate on a work surface. The amplitude of the movement of the mobile workstation is increased as the work surface increases. So, the required length of the guiding chain is extended, and the guiding chain length may be over several meters to reach the extreme operation location furthest from the static connection point.

The guiding chain is deployed or retracted according to the movement of the mobile workstation in order to support the flexible cables and/or pipelines and to allow the mobile workstation to move from the operation location nearest to the static connection point up to the operation location furthest away from the static connection point.

The guiding chain ensures the guiding of flexible cables and/or pipelines (electric and communication cables, water tube, compressed air tube, etc.) at any location of the useful area that the mobile workstation needs to reach. Guiding chains are well-known for guiding hoses, cables, pipelines or the like. One example is commercialized under the trademark "Igus."

Guiding chains are made of numerous chain links connected to one another in articulated manner, as disclosed in the document US 2003/0000198 A1.

The guiding chain has to be stored when the mobile workstation is near the static connection point. The guiding chain also must be deployed when the mobile workstation is near the operation location furthest away from the static connection point.

In the field of apparatus for guiding flexible supply pipelines, it is known to use a return wheel with a guiding chain wrapped at least partially thereon, said return wheel including a chain wheel which rolls freely upon a part of said guiding chain and is driven by movement of said guiding chain, wherein surplus length of guiding chain is taken up and laid down in a loop during movement of said workstation.

Document U.S. Pat. No. 4,600,817 is an example where a mobile workstation is connected by flexible pipelines to a static connection point.

However, this known guiding system comprises a guiding chain bent in two opposite directions once installed in the guiding system, which is a very rare and very expensive guiding chain. This known guiding system also offers no protection against the folding of the guiding chain.

A simple winding of a guiding chain longer than few meters around an axis takes up a volume whose dimensions are incompatible with the common size of sheds. No realistic solution exists to completely deploy or retract a guiding chain longer than 14 meters.

The invention thus aims at deploying and storing a guiding chain bent in only one direction, simply, safely and efficiently, whatever the position of the mobile workstation is between the operation location closest to the static connection point and the operation location furthest from the static connection point, avoiding any folding of the guiding chain whatever the length of the guiding chain is.

It is also an object of the present invention to propose a solution to deploy and to store a guiding chain without wasting storing space when the mobile workstation is at the closest location to the static connection point.

SUMMARY OF THE INVENTION

Thus, the invention relates to an installation as described in claim 1.

The static connection point is the place where the different supplies are delivered (electricity, water, compressed air, etc.). The different supplies are all grouped on the same element with similar orientation and are available through an element connectable to the end of a pipeline and/or cable.

A mobile workstation is an operation device able to perform several actions in a workspace. For example, in the field of agriculture, the mobile workstation can humidify, ventilate, position and remove a substrate, deliver food, etc.

Thus, the invention makes it possible to deploy and to store the guiding chain simply, efficiently and safely.

According to the invention, straight guiding chain means that the guiding chain can be bent in the same plane but not folded. The straight guiding chain can be bent, as long as the guiding chain remains in the same plane. The plane of the guiding chain is usually vertical.

Avoiding folding of the guiding chain is very important. According to the invention, folding means to form a fold beyond the mechanical limits bearable by the guiding chain. Thus, folding the guiding chain may result into damages to the guiding chain itself, and also to the cables and pipelines.

The space required for storing the guiding chain is also an important criterion to optimize the installation. Increasing the work surface results in an increase of the distance traveled by the mobile workstation, which results in an increase of the length of the guiding chain. The risk of folding the guiding chain and the space required for storing increase with the length of the guiding chain.

According to the invention, one element "close to" another element means that the elements are at the same location, same orientation, and are located at a limited distance. The limited distance is the minimum distance possible while ensuring a stable fixation of each element during operation.

According to various aspects, one or more of the following features may be implemented.

According to some embodiments, the invention relates to an installation as described in claim 2.

Thus, the most common type and simple structure of guiding chains can be used as guiding chain.

According to some embodiments, the invention relates to an installation as described in claim 3.

Thanks to the said security cable, the tension force applied to the guiding chain and to the cables and/or pipelines is reduced, reducing the wear of the guiding chain, and reducing risk of guiding chain breakage.

According to some embodiments, the invention relates to an installation as described in claim 4.

Thus, standard available industrial asynchronous engines can be used to operate the guiding chain carrier system.

According to some embodiments, the second engine can start only when the first engine is actually moving the mobile workstation. The second engine can also stop if the first engine cannot move despite a moving signal sent to the first engine. Such configuration avoids having the compensation trolley moving without the working station moving.

Thus, the wear applied on the guiding chain can be controlled.

The tension force applied on the security cable remains at a targeted value recorded in the controller, within a defined range. The value of the targeted tension force, depends on the materials used, the weight of the different movable elements and the position of the mobile workstation.

According to some embodiments, immobilization of the system can be applied in case one parameter is getting outside a normal operating range. It reduces risk of damages and limits damages.

According to some embodiments, someone can be informed that there is an issue at the installation and can try to manually solve the issue, for example the mobile workstation being blocked in its movement by an element.

According to some embodiments, the invention relates to a guiding chain carrier system as described in claim 8.

Thus, the guiding chain can be carried by the compensation trolley allowing a loop of the guiding chain according to a steady diameter.

According to some embodiments, the invention relates to an installation as described in claim 6.

Thanks to the said fixed pulley, the guiding chain can be bent back above the mobile workstation or below the work surface, optimizing the space used by the guiding chain carrier system.

According to some embodiments, the invention relates an installation as described in claim 7.

Thanks to this arrangement, the weight of the guiding chain is mainly supported by the lateral lengthwise case. Thus, this arrangement reduces the wear of the guiding chain and of the guiding chain carrier system and reduces the risk of guiding chain breakage.

According to some embodiments, the invention relates to an installation as described in claim 8.

According to some embodiments, the invention relates to an installation as described in claim 9.

Thus, the ground footprint is optimized, and the yield is multiplied by the number of work areas one under the other, without requesting investing into several additional mobile workstations.

Thus, the only remaining limitation regarding the size of the work surface is the time requested by the mobile workstation to operate over the whole work surface compared to the time limit to perform all the operations. Such time limit exists for instance in the field of agriculture.

According to some embodiments, the invention relates to an installation as described in claim 10.

Thus, the yield per square-meter of, for example, an automatic culture installation, can be increased and optimized to its maximum.

These application fields impose to have heavy elements on the work surface, requesting reinforcement based on the ground along both lateral edges of the work surface. Thus, the length of the guiding chain must be at least the whole length of one work area plus the length to reach the work area furthest from the static connection point . . .

BRIEF DESCRIPTION OF THE DRAWINGS

Embodiments of the invention will be described below, in relation to the following drawings.

On the drawings, the same reference signs show the same or similar objects.

DETAILED DESCRIPTION

Figure 1:
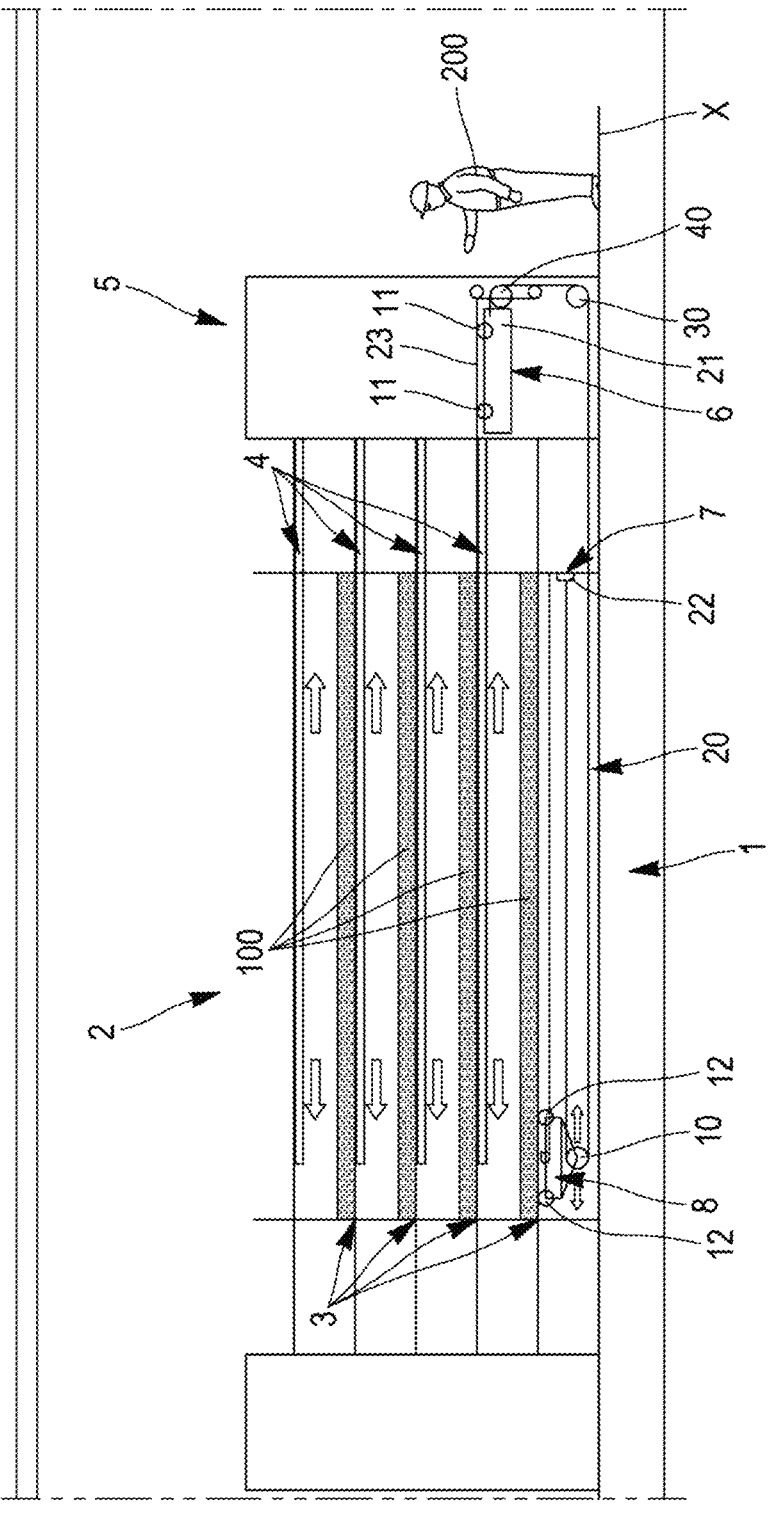
FIG. 1 shows a schematic simplified side view of an automatic breeding installation, with four 6-meter-long culture areas one under the other comprising a guiding chain carrier system comprising a compensation trolley mounted under the lowest culture floor, the mobile workstation being at the operation location nearest the static connection point.

FIG. 1 shows an installation according to one possible embodiment of the invention. According to the present example, the installation is a breeding installation 2 to breed insects. The breeding installation 2 comprises a plurality of work areas 3, also named culture areas 3 in the case of breeding, which are disposed one above the other. The breeding installation 2 shown is in the middle of a breeding cycle, all the culture areas are loaded with substrate.

For example, the first culture area 3 is installed about one meter above the ground X. The other culture areas 3 are positioned above the first culture area 3.

In this embodiment, all culture areas 3 are identical or similar. A given culture area 3 is disposed horizontally. It may be of a plurality of meter long, for example 6 meter long, or even longer than that. On each culture area 3, the substrate 100 is loaded and unloaded respectively at the beginning and at the end of one breeding cycle. The installation 2 comprises a guiding chain carrier system 1 which will be described in more details below.

Vertical columns, not represented, are positioned on each longitudinal side at regular spacing to support the weight of the culture areas 3.

One lift system 5 is provided to vertically lift a mobile workstation 6. The lift system 5 is installed at one lateral side of the culture areas 3.

Each culture area 3 is made of stainless-steel. The structure of each culture area 3 is a rectangular plate. The longitudinal edges 31 of each culture area 3 have flanges in order to retain a substrate on the upper surface of the culture area 3. The lateral edges of each culture area 3 are flat to facilitate the loading and unloading of the substrate 100. On the lower surface of each stainless-steel rectangular plate, a guiding rail 4 is provided. The guiding rail 4 is parallel to the longitudinal edges. The guiding rail 4 extends longitudinally, is straight, and positioned in the middle of the lower surface of the stainless-steel rectangular plate.

A first engine installed on a mobile workstation 6 can move the mobile workstation 6 above culture areas 3. The mobile workstation 6 is connected to cables and pipelines. The cables and pipelines are of three types:

- carrying energy, like electricity, compressed air,
- supplying products like water to irrigate the substrate,
- exchanging digital data like commands to operate the mobile workstation or monitoring sensors data.

The mobile workstation 6 is connected by an ethernet cable to send and receive data. The mobile workstation 6 is also connected to a controller.

According to the FIG. 1 embodiment, the mobile workstation has suspension wheels 11. As shown on FIG. 1, the said suspension wheels 11 are positioned on a rail section 23 of the lift system 5 connectable to any of the guide rails 4. The lift system 5 positions the rail section 23 in continuity with the guide rails 4 corresponding to a culture area 3 selected by an operator 100 or through a processor programmed by the operator to repeat cycles of movements of the mobile workstation.

Figure 4:
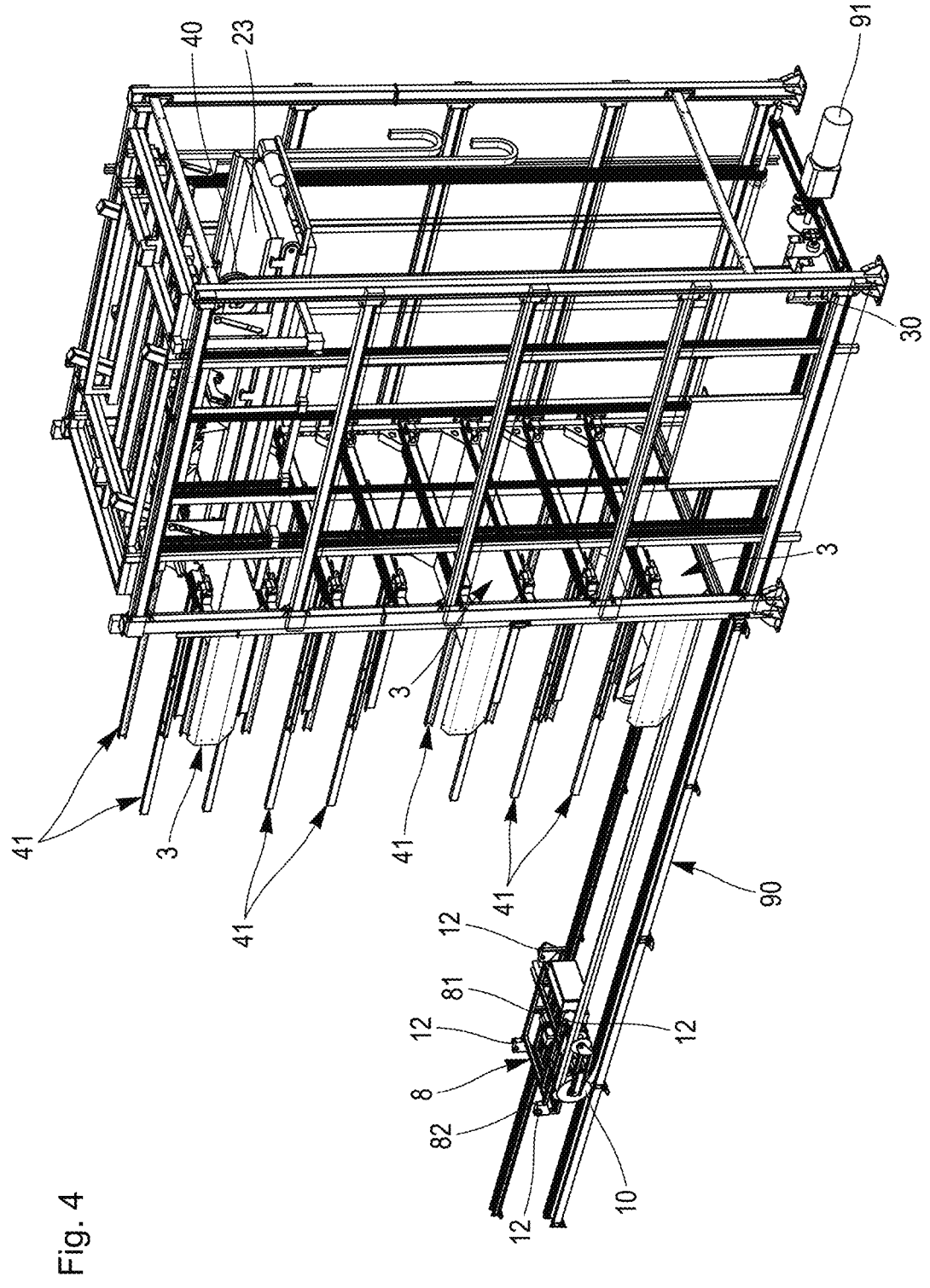
FIG. 4 shows a 3D detailed view of the automatic breeding installation, working areas being cut and not completely displayed to give a better visual access to the guiding chain carrier system. Compensation rail and mobile workstation are not displayed either.

According to the FIG. 4 embodiment, guide rails 41 are above each longitudinal edge 31 of the working area. The mobile workstation, not shown on the FIG. 4, has supporting wheels instead of suspension wheels 11 as in the FIG. 1 embodiment. The lift system operation is similar as described above.

A static connection area 7 is located under the first culture area 3. The static connection area 7 is a vertical side of a wall where all the sockets alimented by these sources of energy, water, and data exchange are grouped. The position of the static connection area 7 is approximately halfway between the ground and the first culture area. The static connection area 7 is close to the lateral side of the culture areas where a lift system 5 is located. The static connection area 7 is oriented towards the opposite lateral side of the culture areas 3. Alternatively, there might be a plurality of static connection areas for various cables and/or pipelines.

Below the static connection area 7, there is a hole to let the guiding chain 20 pass horizontally.

The cables and pipelines are connected to the static connection area 7. The lengths of the said cables and pipelines are enough to let the mobile workstation 6 move to an operation location furthest from the static connection area 7.

These cables and pipelines are guided by a 1-dimension guiding chain 20. The guiding chain 20 is made of numerous chain links of hollow parallelepiped structure connected to one another according to an axis of rotation. Each rotation axis is located close to one single side of the guiding chain 20. The minimum possible angle between two contiguous chain links without damaging the 1-dimension guiding chain 20 is 150° degrees. The maximum possible angle between two contiguous chain links without damaging the 1-dimension guiding chain 20 is 190°. All the rotation axis are parallel. Thus, flexibility operates essentially on only one side of the guiding chain 20, such a guiding chain is named 1-dimension guiding chain. Thus, the final assembled 1-dimension guiding chain 20 is a corridor where cables and/or pipelines can be threaded.

The first extremity 21 of the 1-dimension guiding chain is fixed on the mobile workstation 6, on an axis fixed perpendicular of one lateral side of the mobile workstation. The second extremity 22 of the 1-dimension guiding chain 20 is fixed on the static connection area 7.

The 1-dimension guiding chain 20 is installed vertically in a position comprising several windings all oriented towards the only flexible side of the guiding chain 20. This position results of the interaction between the 1-dimension guiding chain 20 and three chain pulleys 10, 30, 40 positioned in the vertical plane defined by the 1-dimension guiding chain.

A compensation rail 9 is provided fixed under the culture area 3 closest to the ground X level. A compensation trolley 8 comprises four sustaining wheels 12 and a pinion 82 interacting with a rack 9, and a second engine 81 able to apply a compensation force on the pinion 82.

The compensation trolley 8 comprises also the first chain pulley 10. The first chain pulley 10 is mounted on a longitudinal side of the compensation trolley 8, its axis of rotation is connected to the compensation trolley 8 by a lateral structure 83 comprising several rods and a metal plate protruding on one longitudinal side of the compensation trolley 8. The height of the lateral structure 83 is less than the diameter of the chain pulley 10 and the chain pulley 10 is mounted on this structure to be both higher and lower than this structure. Thus, once mounted on the installation 2, the guiding chain 20 is putting pressure on the structure 83. The structure 83 is more resistant to pressure force than to stretching force. To avoid any friction between the guiding chain 10 and the lateral structure 83, a supporting wheel 85 is added on the lateral structure 83, at the opposite side and at an upper position of the first chain pulley 10, on the lateral structure 83.

The compensation trolley 8 is keeping the orientation of the guiding chain 20 according to a U-turn configuration. The guiding chain 20 is starting horizontally from the static connection area 7, wrapping around the first chain pulley 10, horizontally and below the static connection area 7. The compensation trolley 8 is moving thanks to the sustaining wheels 12 supported on the rack 9. The compensation trolley 8 comprises the second engine 81 applying a force to retain the movement of the compensation trolley 8 to maintain the guiding chain 20 straight. The compensation trolley 8 is connected to a source of electric energy by cables guided by a secondary guiding chain not represented. Retaining force is when the mobile workstation 6 is getting closer to the static connection area 7; the retaining force is reduced when the mobile workstation 6 is getting further from the static connection area 7. Thus, there is no folding and nor stretching of the guiding chain 20.

After passing between the ground X and the static connection area 7, the guiding chain 20 passes below the lift system 5 and reaches a second chain pulley 30 attached to the installation 2. The second chain pulley 30 is changing the orientation of the guiding chain 20 from horizontal to vertical. The second chain pulley 30 is vertically aligned with a third chain pulley 40. The third chain pulley 40 is attached to the vertically movable part of the lift system 5 comprising a support section 23 able to support the mobile workstation 6. The third chain pulley 40 is changing the guiding chain 20 orientation from vertical to horizontal.

The lift system 5 can be controlled directly by the operator 100 or through the processor programmed by the operator to repeat cycles of movements of the mobile workstation. The same mobile workstation can thus operate on all the culture areas 3 by selecting one level of the culture area 3, then another one.

Figure 2:
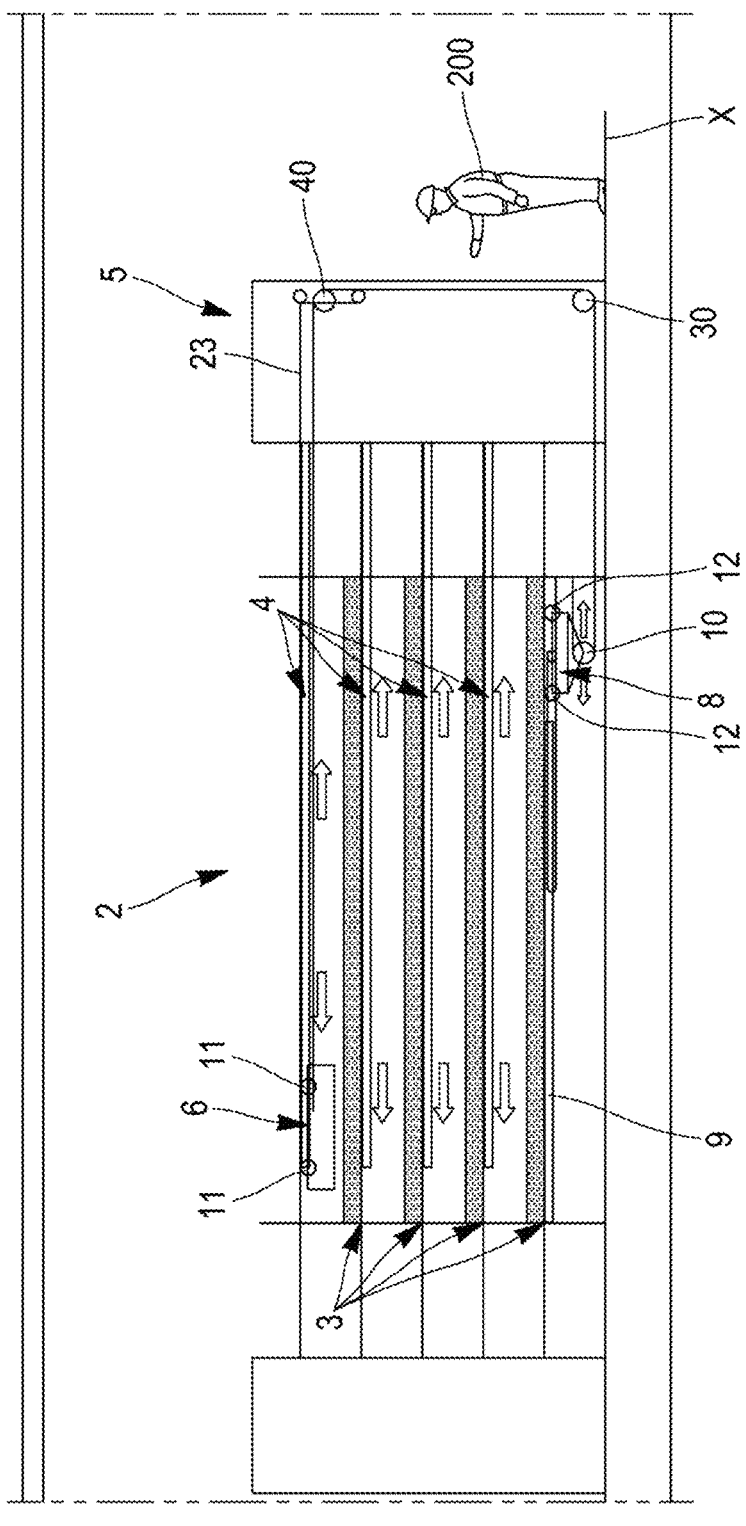
FIG. 2 shows the same schematic simplified side view of the same automatic breeding installation as FIG. 1, the mobile workstation being at the operation location furthest from the static connection point.
Figure 3:
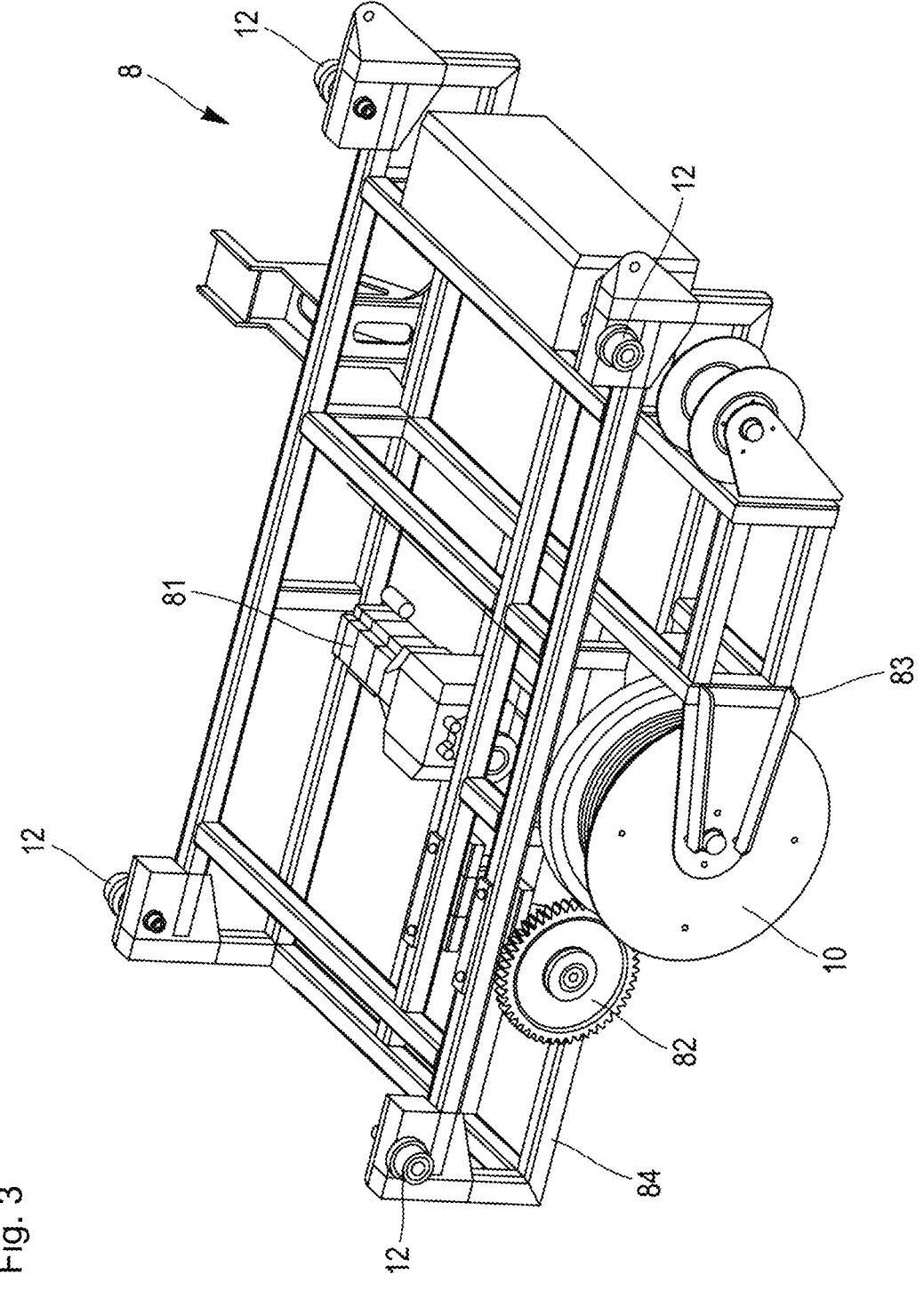
FIG. 3 shows a 3D detailed view of only the compensation trolley from a side and upper point of view.

As shown on FIG. 2, for example, after the operator has selected the fourth level, the lift system 5 reached the furthest position to work on the culture area 3.

The retaining force is applied on the guiding chain by the second engine 81 through the interaction between the pinion 82 and the track 9. The retaining force to be applied is calculated by the controller based on the values of the signals sent by or to the first engine.

The compensating system comprises a controller which is monitoring several signals and generates several command signals according to three different processes.

The first movement process, also named normal horizontal process, is described here below:

The initial phase is a blocked configuration wherein both first and second engines are blocked in rotation and the mobile workstation is at a standby position illustrated FIG. 1.

Firstly, the controller receives an order to move the mobile workstation 6 and to perform actions among several possible actions.

Secondly, the controller analyzes this information and calculates as a result a first command signal sent to the first engine.

Thirdly, the first engine generates a first representative signal of its movement.

Fourthly, when the controller receives the first representative signal, it generates a second command signal to the second engine 81. The second command signal intensity is calculated to move the compensating trolley 8 at half speed and opposite direction compared to the movement of the mobile workstation 6.

Fifthly, the controller sends to the mobile workstation 6 a command signal to execute the actions.

Sixthly, when the order is accomplished, the controller sends the order to move back the mobile workstation 6 and to stop the first engine and the second engine 81 in the initial standby position.

If the received command comprises a change of level, a second movement process is added twice, before and after the horizontal process.

The second movement process, also named normal vertical process, is described here below.

The initial phase is when the mobile workstation is completely supported by the vertically movable part 23.

Firstly, the controller receives an order to move the mobile workstation 6 to a different level of working area 3.

Secondly, the controller analyzes this information and calculates as a result a third command signal to a third engine 91 to move the movable part 23 upward or downward, in the direction toward the required level.

Thirdly, the third engine 91 generates a third representative signal of its movement.

Fourthly, when the controller receives the third representative signal, it generates a second command signal to the second engine 81. The second command signal intensity is calculated to move the compensating trolley 8 at half speed compared to the speed of the movable part 23. The direction of the compensating trolley 8 is closer to the lift system 5 if the movement of the vertical movable part 23 is an upward movement. The direction of the compensating trolley 8 is further away from the lift system 5 if the movement of the vertical movable part 23 is a downward movement.

Fifthly, the lift system 5 sends to the controller a command signal to indicate the level reached by the vertical movable part 23. When the initial level order is indicated as reached by the lift system 5 to the controller, the controller sends the order to stop and block the third engine 91 and the second engine 81.

If the resistance force applied on at least one of the engines is over a normal range, a third movement process, also named emergency stop process, is launched as described here below.

Firstly, the initial phase is when one of the first, second or (and) third engine(s) is (are) sending to the controller a resistance signal outside of the normal range.

Secondly, the controller immediately interrupts any ongoing movement command signal.

Thirdly, the controller sends a signal to block all the engines.

Fourthly, the controller activates a red light and generates an alarm sound.

According to FIG. 1, the mobile workstation comprising four sustaining wheels 11 is located on the lift system 5, at the level of the first culture area.

Not visible on the figures, a flexible security cable made of steel is following the same path as the guiding chain 20. The end points of the security cable are fixed to the same elements as the end points 21, 22 of the guiding chain 20. The length of the security cable is slightly shorter than the guiding chain 20. This difference of length between the security cable and the guiding chain 20 is not enough to generate any folding of the guiding chain 20. Nevertheless, when a tension force appears, it is largely supported by the security cable instead of the guiding chain 20.

The chain pulleys are positioned on one longitudinal side of the compensation trolley and on one longitudinal side of the mobile workstation. The said longitudinal side are the sides parallel to the direction of movement of the mobile workstation.

The path segments followed by the guiding chain comprises several longitudinal lengthwise cases for storing the guiding chain 20. One longitudinal lengthwise case is shown on FIG. 4.

For supporting the weight of the guiding chain 20, a longitudinal lengthwise case 90 is fixed on the installation 2, as illustrated on FIG. 4. The said longitudinal lengthwise case 90 is holding the guiding chain between the first chain pulley 10 and the second chain pulley 30. Similar longitudinal lengthwise case not represented is fixed on the installation to hold the guiding chain between the third pulley 40 and the mobile workstation 6.

The controller keeps the information of the current location reached by the mobile workstation 6. The controller receives an instruction comprising a dedicated level of work area 3.

If the mobile workstation 6 is not on the vertical movable part 23, the instruction is kept in the memory of the controller in a row of standby instructions. If the mobile workstation 6 is not on the vertical movable part 23, and if the mobile workstation 6 is not yet at the level corresponding to the dedicated work area 3, the controller first launches the normal vertical process.

When the mobile workstation 6 is at the selected work area 3, the controller launches a first normal horizontal process. The first normal horizontal process direction is toward the side opposite to the side where the lift system 5 is set up.

The installation 2 sends a first detection signal when the mobile workstation has reached the opposite end of the work area 3. When the controller receives the first detection signal, the controller stops the first normal horizontal process and launches a second normal horizontal process. The direction of the second normal horizontal process is opposite to the first normal horizontal process.

When the mobile workstation is completely back on the vertical movable part 23, a second detection signal is sent to the controller. When the controller receives this second detection signal, the controller stops the second normal horizontal process. In case there is not another instruction in standby, the controller launches a normal vertical process in the direction to the lowest work area 3.

Further variations of the subject of the invention by exchanging individual features among themselves or for equivalents and combinations thereof fall within the scope of the present invention.

The invention claimed is:

1. An installation comprising a guiding chain carrier system, configured to deploy and store a guiding chain and flexible supply cables and/or pipelines while avoiding folding, wherein the guiding chain carrier system comprises:
   a mobile workstation movable over a work surface by a first engine and connected to the flexible cables and/or pipelines;
   at least one guiding chain, connected at one end to a static connection area and at another end to the mobile workstation to the flexible cables and/or pipelines; and
   at least one compensation trolley, comprising a compensation system,
   wherein the compensation trolley is movable by a second engine,
   wherein the compensation system is configured to generate a resistance force calculated by a controller based on values of signals sent by or to the first engine in to maintain the guiding chain bent in a single plane without forming a fold beyond mechanical limits of the guiding chain while the mobile workstation moves between a location nearest to and a location furthest from the static connection area, and
   wherein the compensation trolley is located under the work surface.

2. The installation guiding chain carrier system as claimed in claim 1, wherein the guiding chain comprises numerous volumes, defining a corridor, connected to one another by a limited axis of rotation, each rotation axis is located close to one single side of the guiding chain, obtaining a chain flexible essentially on only one side of the guiding chain.

3. The installation as claimed in claim 1, comprising at least one security cable which end points are fixed close to the end points of the guiding chain, following the same path as the guiding chain, and the length of which is shorter than the guiding chain without creating any folding of the guiding chain.

4. The installation as claimed in claim 1, wherein:
   the mobile workstation comprises the first engine driving the mobile workstation,
   the compensation system comprises the second engine driving the compensation trolley,
   the controller is configured to coordinate operations of the first engine and the second engine so as to move the mobile workstation according to a received movement instruction while maintaining the guiding chain bent in the single plane without forming a fold beyond the mechanical limits of the guiding chain.

5. The installation as claimed in claim 1, wherein the compensation trolley comprises at least one first chain pulley moving according to movements of said guiding chain wrapped at least partially thereon the first chain pulley.

6. The installation as claimed in claim 5, comprising at least one second chain pulley fixed on the installation, rotatable according to the movements of said guiding chain wrapped at least partially thereon, for changing the axis direction of the guiding chain.

7. The installation as claimed in claim 1, wherein the guiding chain is positioned on one longitudinal side of the compensation trolley and on one longitudinal side of the mobile workstation, the said longitudinal side being parallel to the direction of movement of the mobile workstation, and wherein at least one longitudinal lengthwise case for storing the guiding chain is adapted to be fixed on the installation.

8. The installation as claimed in claim 1, wherein the mobile workstation and the compensation trolley are configured to move in opposite directions along two parallel axes.

9. The installation as claimed in claim 6, wherein the work surface is split into several work areas one under the other, and
   wherein the installation further comprises a lift system comprising:
   a vertically movable part configured to receive, to support and to deliver the mobile workstation from one level of work area to another level of work area,
   a third engine configured to move the vertically movable part, the third engine being configured to cooperate with the second engine to avoid folding and breakage of the guiding chain,
   at least two chain pulleys, comprising a third chain pulley, the second chain pulley fixed under the lowest position of the mobile workstation, and the third chain pulley fixed on the vertically movable part.

10. The installation as claimed in claim 1, wherein the installation is used in the fields of breeding insects, cultivating mushrooms or logistics.

11. An installation comprising a guiding chain carrier system, configured to deploy and store a guiding chain and flexible supply cables and/or pipelines while avoiding folding, wherein the guiding chain carrier system comprises:
   a mobile workstation movable over a work surface by a first engine and connected to the flexible cables and/or pipelines;
   at least one guiding chain, connected at one end to a static connection area and at another end to the mobile workstation to the flexible cables and/or pipelines; and
   at least one compensation trolley, comprising a compensation system,
   wherein the compensation trolley is movable by a second engine,
   wherein the compensation system is configured to generate a resistance force calculated by a controller based on values of signals sent by or to the first engine to maintain the guiding chain bent in a single plane without forming a fold beyond mechanical limits of the guiding chain while the mobile workstation moves between a location nearest to and a location furthest from the static connection area,
   wherein the mobile workstation comprises the first engine driving the mobile workstation,
   wherein the compensation system comprises the second engine driving the compensation trolley, and
   wherein the controller is configured to coordinate operations of the first engine and the second engine so as to move the mobile workstation according to a received movement instruction while maintaining the guiding chain bent in the single plane without forming a fold beyond the mechanical limits of the guiding chain.

12. An installation comprising a guiding chain carrier system, configured to deploy and store a guiding chain and flexible supply cables and/or pipelines while avoiding folding, wherein the guiding chain carrier system comprises:
   a mobile workstation movable over a work surface by a first engine and connected to the flexible cables and/or pipelines;
   at least one guiding chain, connected at one end to a static connection area and at another end to the mobile workstation to the flexible cables and/or pipelines; and at least one compensation trolley, comprising a compensation system, wherein the compensation trolley is movable by a second engine, wherein the compensation system is configured to generate a resistance force calculated by a controller based on values of signals sent by or to the first engine to maintain the guiding chain bent in a single plane without forming a fold beyond mechanical limits of the guiding chain while the mobile workstation moves between a location nearest to and a location furthest from the static connection area, and wherein the compensation trolley comprises at least one first chain pulley moving according to movements of the guiding chain wrapped at least partially thereon the first chain pulley.

13. An installation comprising a guiding chain carrier system, configured to deploy and store a guiding chain and flexible supply cables and/or pipelines while avoiding folding, wherein the guiding chain carrier system comprises:

a mobile workstation movable over a work surface by a first engine and connected to the flexible cables and/or pipelines;

at least one guiding chain, connected at one end to a static connection area and at another end to the mobile workstation to the flexible cables and/or pipelines; and at least one compensation trolley, comprising a compensation system, wherein the compensation trolley is movable by a second engine, wherein the compensation system is configured to generate a resistance force calculated by a controller based on values of signals sent by or to the first engine to maintain the guiding chain bent in a single plane without forming a fold beyond mechanical limits of the guiding chain while the mobile workstation moves between a location nearest to and a location furthest from the static connection area, and wherein the guiding chain is positioned on one longitudinal side of the compensation trolley and on one longitudinal side of the mobile workstation, the longitudinal side being parallel to a direction of movement of the mobile workstation, and wherein at least one longitudinal lengthwise case for storing the guiding chain is adapted to be fixed on the installation.

* * * * *